United States Patent [19] [11] 4,352,660
Steiner et al. [45] Oct. 5, 1982

[54] METHOD AND APPARATUS FOR BURNING FINE-GRAIN MATERIAL

[75] Inventors: Janos Steiner, Budapest; Kalman Wenzly; Jozsef T. Toth, both of Almasfuzito, all of Hungary; Peter Tiggesbaumker, Oelde, Fed. Rep. of Germany; Wolf Goldmann, Beckum, Fed. Rep. of Germany; Gerhard Butschko, Hamm, Fed. Rep. of Germany

[73] Assignees: Magyar Aluminiumipari Troszt, Hungary; Krupp Polysius AG, Fed. Rep. of Germany

[21] Appl. No.: 226,476

[22] Filed: Jan. 19, 1981

[30] Foreign Application Priority Data

Jan. 23, 1980 [HU] Hungary ................................ 136/80

[51] Int. Cl.³ .......................... F27B 15/00; C01F 7/02
[52] U.S. Cl. ....................................... 432/14; 423/625; 432/15; 432/58
[58] Field of Search ............................ 432/14, 15, 58; 423/625, 628

[56] References Cited

U.S. PATENT DOCUMENTS

| | | | |
|---|---|---|---|
| 2,867,429 | 1/1959 | Heath | 432/58 |
| 3,336,109 | 8/1967 | Du Bellay et al. | 423/625 |
| 4,127,406 | 11/1978 | Kreft et al. | 432/15 |
| 4,191,526 | 3/1980 | Triebel | 432/58 |
| 4,203,689 | 5/1980 | Kraxner et al. | 432/58 |
| 4,250,774 | 2/1981 | Kraxner et al. | 432/15 |

*Primary Examiner*—John J. Camby
*Attorney, Agent, or Firm*—Learman & McCulloch

[57] ABSTRACT

The invention relates to a method of burning, calcining or sintering fine-grain material in which the burnt material separated from the gas flow is supplied to a residence container from which a part of the material is returned to the burning zone and the remainder of the material is supplied to the cooling zone. Such a method is distinguished by a low heat and energy requirement and by a simple construction of the apparatus and permits ideal adaptation of the burning conditions to the particular material.

13 Claims, 2 Drawing Figures

METHOD AND APPARATUS FOR BURNING FINE-GRAIN MATERIAL

Figure 1:
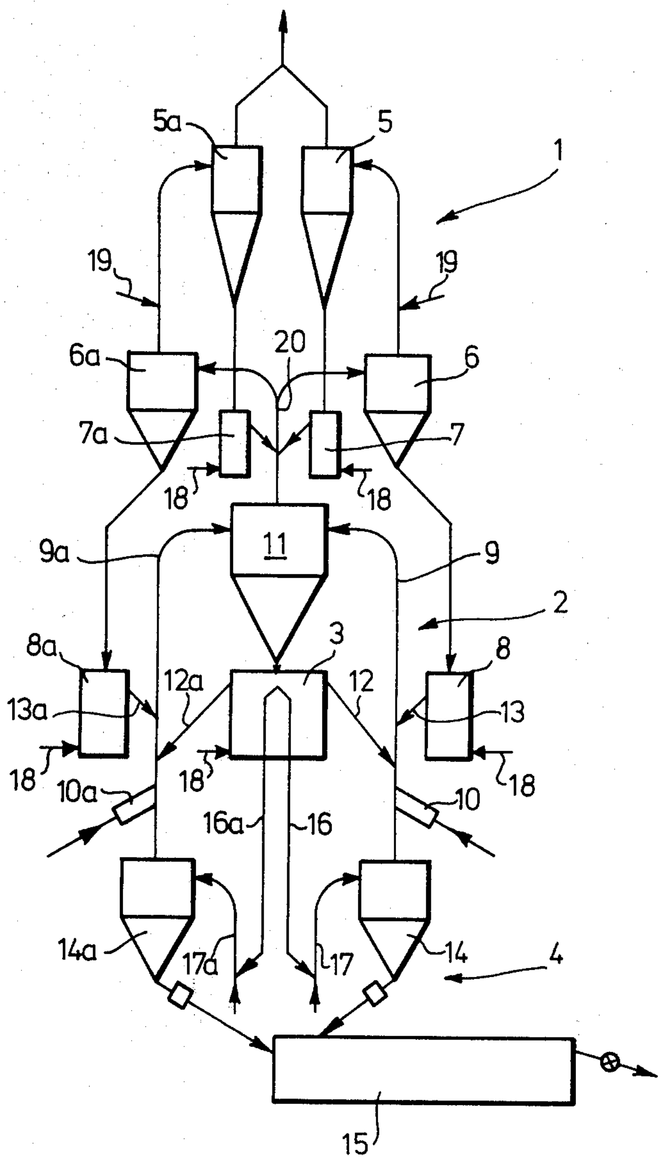

The invention relates to a method and apparatus for burning, calcining or sintering fine-grain material, in particular alumina in which the material is preheated in a multi-stage cyclone preheater by the hot waste gases of a burning zone, completely burnt in the burning zone and cooled in a cooling zone, an adjustable portion of the material after passage of the burning zone and deposition from the gas flow being reintroduced into the burning zone.

A method of the aforementioned type is for example known from DE-AS 1,767,628. In this case the burning zone is formed by a fluidized bed reactor from which a portion of the material is discharged continuously upwardly, said material after deposition in a cyclone being returned to the lower region of the fluidised bed reactor. A further portion of the material is continuously withdrawn as finished material from the fluidised bed reactor in the lower region and supplied to the cooling zone. A disadvantage with this known method is in particular the high energy requirement due to the high gas pressure.

A method (DE-AS 2,008,774) is also known in which the material heated in the burning zone to the finished burning temperature is kept prior to entry into the cooler for a certain time in a residence zone which consists essentially of a shaft-like residence container and a separator. By additional burners the cool air supplied to the residence container can be heated to the necessary degree. An advantage of this method is that a uniform heat treatment of material particles of different size is achieved and the residence time can be adapted optimally to the particular material involved. For many applications however a further simplification of the apparatus is desired.

The invention is therefore based on the problem of developing a method of burning fine-grain material, in particular calcining alumina, which is distinguished by a low heat and energy requirement and a simple construction of the apparatus and which permits ideal adaptation of the burning conditions to the particular material involved.

This problem is solved according to the invention in that the burnt material separated from the gas flow is supplied to a residence container from which a preferably adjustable portion of the material is returned to the burning zone and the remainder of the material is returned to the cooling zone.

In this residence container a heat exchange takes place between the individual burnt material particles as well as a homogenisation of the grain size. Furthermore, in this residence container various chemical and physical reactions take place and in the calcining of alumina the formation of the α-modifications, which is a function of temperature and residence time, can be controlled exactly within wide limits. In this manner any desired α-alumina contents can be obtained.

According to an expedient further development of the invention the burning zone is formed by a conduit which extends substantially vertically and is traversed by gas from the bottom to the top and in the lowermost region of which a burner assembly is provided into which opens at a somewhat higher point a return conduit coming from the residence container and to which is connected at a point thereabove a material conduit coming from the preheater.

With such a design of the burning zone the burning or calcining operation takes place in suspension, avoiding any troublesome agglomeration. Preferably, gasification burners are used which ensure a good combustion and a low solid concentration in the actual burning zone. Furthermore, in the calcining of alumina gasification burners avoid an inhibitor action of the alumina on the carbon combustion.

Due to the vertical staggering in the introduction on the one hand of the burnt (recycled) material and on the other of the preheated material in the burning zone the hot combustion gases firstly come into contact with the already burnt recycled portion of the material and further heat said material before passing their further heat content to the preheated material.

The apparatus according to the invention, which consists essentially of cyclones of known design and of residence containers, is distinguished by a very simple construction, low heat requirement (low wall heat losses) and in particular by a very low gas pressure and consequently a very low electrical power requirement. In contrast to known fluidised bed methods the method according to the invention operates with a total pressure which is determined essentially only by the pressure loss of the cyclone stages and for the production of which a simple radial fan suffices. A higher pressure is required only for the fluidisation of the residence containers, but only for a very small amount of air. Thus, for example, in particular the material disposed in the residence container of the burning zone is fluidised with a small amount of air, preferably with 5 to 15 g air per kg material. This air can be preheated by waste heat (e.g. waste gases or flue gases). The fluidisation can also take place directly with waste gas or flue gas.

According to the invention a further residence container, preferably fluidised with cooler air, can be connected in each case to the material discharge tubes of the cyclones of the cyclone preheater. Said residence containers, in which the material is disposed in an only slightly fluidised bulk material, seal with the material the discharge conduit of the cyclone thereabove so that no special mechanical means (such as pivot flaps or the like) are necessary.

The residence time of the material in the individual residence containers may be varied according to the invention by simple adjustment of the discharge opening in a wide range and adapted to the particular conditions. Preferably, the residence container intended to receive the burnt material is so dimensioned that a residence time of up to half an hour can be adjusted for the finished material.

Figure 2:
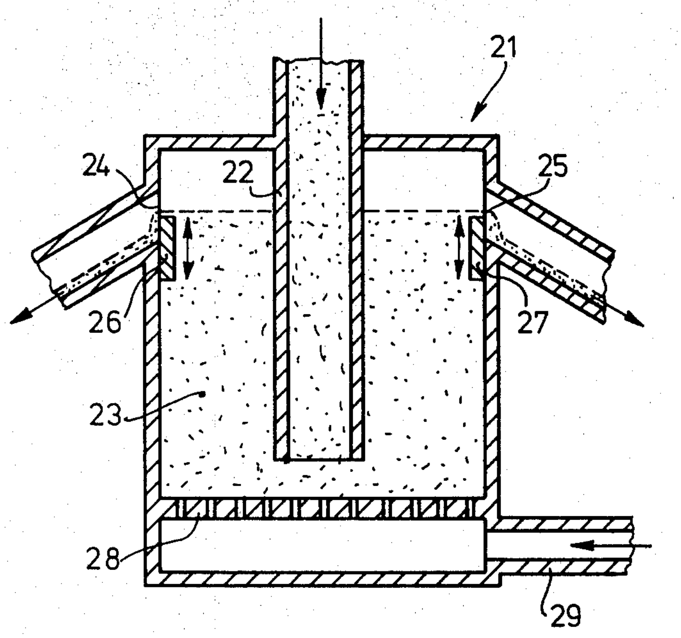

These and further details of the invention will be apparent from the following description of an example of embodiment illustrated in the drawings, wherein FIG. 1 is a schematic illustration of an apparatus for carrying out the method according to the invention;

FIG. 2 is a section through an example of embodiment of a residence container.

The apparatus according to FIG. 1, serving preferably for calcining alumina, comprises essentially a multi-stage cyclone preheater 1, a burning zone 2, a residence container 3 and a cooling zone 4.

The cyclone preheater 1 comprises two paths connected in parallel as regards the gas and material route and includes in each of said two paths two cyclones 5, 6 and 5*a*, 6*a* respectively. The cyclones 5, 5*a* of the uppermost cyclone stages are followed by residence containers 7, 7a and the cyclones 6, 6a of the second cyclone stage by residence containers 8, 8a.

The burning zone 2 also comprises two paths and includes two substantially vertically extending conduits 9, 9a which contain in their lowermost region at a first level a burner assembly 10 and 10a respectively. The two conduits 9, 9a open into a common separator 11 whose material discharge conduit is introduced into the aforementioned residence container 3. From the residence container 3 two material supply lines 12, 12a lead to the conduits 9, 9a forming the burning zone. Said material lines 12, 12a open at a second level above the burner assembly 10 and 10a into the conduits 9 and 9a respectively. From the residence containers 8, 8a material lines 13, 13a lead to the conduits 9 and 9a; they open at a third level above the material lines 12 and 12a into the conduits 9, 9a.

The cooling zone 4 comprises two parallel-connected cyclones 14, 14a and a fluidised bed cooler 15. Material lines 16, 16a lead from the residence container 3 to the cooling air conduits 17, 17a which connect the fluidised bed cooler 15 to the cyclones 14, 14a. A small amount of cooler air is supplied as fluidising air, as indicated by the arrows 18, to the residence containers 3, 7, 7a, 8, 8a in the lower region.

The mode of operation of the apparatus according to FIG. 1 is as follows:

The material to be calcined is introduced at 19 into the gas conduits leading to the cyclones 5, 5a of the uppermost cyclone stage. After deposition in said cyclones it passes to the residence containers 7 and 7a respectively. After a certain residence time the material is passed from the residence containers 7, 7a to the gas conduit 20 which leads from the separator 11 to the cyclones 6, 6a. After further preheating by the hot gases and deposition in the cyclones 6, 6a the material then passes to the residence containers 8, 8a. After a certain residence time it is passed from the latter to the conduits 9, 9a which form the actual burning zone. The material calcined by the hot gases of the burner assembly 10 or 10a passes after separation in the separator 11 to the residence container 3 where it resides for an adjustable time to form the α-modification.

An adjustable portion of the material then passes from the residence container 3 via the lines 12 and 12a to the conduits 9, 9a again and thus traverses the burning zone at least once more.

The remaining portion of the material passes from the residence container 3 via the material lines 16, 16a to the colling zone 4 and is there cooled firstly in the cyclones 14 and 14a and then in the fluidised bed cooler 15.

The gases pass through the apparatus in counterflow to the material: the air of the fluidised bed cooler 15 is supplied to the cyclones 14, 14a. The exhaust air from said cyclones passes through the conduits 9, 9a forming the burning zone, combines in the joint separator 11 and then, after re-division, passes through the cyclones 6, 6a and 5, 5a.

FIG. 2 illustrates an example of embodiment of a residence container.

Said residence container 1 includes a material introduction tube 22 which is connected to the separator (not illustrated) thereabove and projects into the material 23. Furthermore, the residence container 21 is provided in its upper portion with discharge openings 24, 25 with which vertically displaceable shut-off members 26, 27 are associated. In the lower region the residence container is provided with an air-permeable bottom 28 and a connection 29 for the supply of fluidising air.

The function of the residence container 21 should be readily apparent; the material supplied via the material inlet tube 22 resides in the container 21 for a certain time in a relatively dense only slightly fluidised state and then leaves the container 21 through the discharge openings 24, 25. By adjustment of the shut-off members 26, 27 the material flows withdrawn via the discharge openings 24 and 25 may be adjusted as desired.

The illustration of FIG. 2 is intended only as an example of a possible embodiment of the residence container. Thus, for instance, the residence containers 7, 7a and 8, 8a according to FIG. 1 are provided basically only with a single discharge opening whilst conversely the residence container 3 can be provided with a total of four discharge openings (two returning to the burning zone and the other two leading to the cooling zone).

The circulation in the burning zone in the method according to the invention is generally set so that about equal proportions of the material from the residence container are returned to the burning zone and conducted to the cooling zone. The amount corresponding to the production is thus approximately circulated.

The burner assembly 10, 10a used in the burning zone preferably includes one or more gasification burners comprising a lower-temperature stage serving to produce lower-temperature gas and a subsequent combustion stage. In the lower-temperature stage under air deficiency a lower-temperature gas is produced having a smoke spot number (according to Bacherach) of about 1 which is burnt in the subsequent combustion stage. This avoids an inhibitor effect of the alumina on the C combustion, achieves complete burning of the fuel and suppresses agglomeration of the solid.

The invention is further explained by the following

EXAMPLE

A calcining apparatus according to FIG. 1 with a capacity of 50 t/h is charged at 19 continuously with 50 t/h alumina hydrate (aluminium hydroxide) of about 12% adhesive humidity and a temperature of about 65°. The smoke gases have a temperature of about 450° to 480° C. The hydrate deposited in the cyclones 5, 5a is freed from surface moisture and preheated to about 130° C. The smoke of flue gases escape at a temperature of about 130° C.

The hydrate fluidised in the residence containers 7, 7a and having a temperature of about 130° C. comes in the gas line 20 into contact with the waste gases of the burning zone 2 which have a temperature of about 1100° C. The hydrate deposited in the cyclones 6, 6a thereby reaches a temperature of 450° to 480° C.

Via the residence containers 8, 8a the hydrate passes to the conduits 9, 9a of the burning zone 2 and is calcined therein and in the separator 11 to form alumina, the adjustable proportion of the material (by return via the material lines 12, 12a) passing through the burning zone 2 several times.

The heat for drying, dehydrating and complete combustion of the material is produced by burning the fuel supplied via the burner assemblies 10, 10a. Primary air is supplied via the burner assemblies 10, 10a and secondary air via the cooling air lines 17, 17a.

To obtain a specific fuel consumption of about 750 Kcal/kg $Al_2O_3$ a considerable portion of the sensible heat of the alumina material flow must be returned to the system. This is possible via the primary and secondary air.

The primary air supplied via the burner assemblies 10, 10a and the fluidising air indicated by the arrows 18 is heated in the fluidised bed cooler 15 to about 400° to 500° C. The secondary air is also conducted through the fluidised air cooler 15 and heated therein to 850° to 900° C.; it passes via the cooling air conduits 17, 17a to the cyclones 14, 14a.

As a modification of the example of embodiment illustrated in FIG. 2 the vertically displaceable shut-off members 26, 27 can also omitted. The residence container is then so designed that a constant ratio exists between the amount of material discharged via the material lines 16, 16a and the amount of material returned via the lines 12, 12a to the burning zone.

We claim:

1. In a method of burning, calcining, or sintering fine grained alumina material wherein said material is preheated in a preheater, discharged from said preheater to and burnt in a burning zone, discharged from said burning zone to a residence zone, and thence discharged from said residence zone to a cooling zone, and wherein a portion of the material discharged from said residence zone is recycled through said burning zone, and wherein said burning zone comprises a hot gas stream heated at a first level below that of said preheater and flowing upwardly to the latter, the improvement comprising introducing said portion of said material from said residence zone to said burning zone at a second level above said first level and below said preheater, and introducing said material from said preheater to said burning zone at a third level above both of said first and second levels.

2. A method according to claim 1 including dividing into substantially equal portions material discharged from said residence zone.

3. A method according to claim 1 including fluidising material in said residence zone with gas.

4. A method according to claim 3 including fluidising said material with between about 5 to 15 g of gas per kg of material.

5. In apparatus for burning, calcining, or sintering fine grained alumina including a preheater for said material, conduit means forming an upright burning zone through which hot gases flow toward said preheater, burner means communicating with said burning zone at a first level below said preheater for combusting fuel, means for introducing material from said preheater to said burning zone, means forming a residence zone, means for delivering said material from said burning zone to said residence zone, means forming a cooling zone, and means connecting said residence zone to said cooling zone and to said burning zone for delivering a first portion of said material from said residence zone to said cooling zone and a second portion of said material from said residence zone to said burning zone, the improvement wherein the means connecting said residence zone to said burning zone communicates with the latter at a second level above said first level and wherein the means for introducing material from said preheater to said burning zone communicates with the latter at a third level above said second level.

6. Apparatus according to claim 5 including means for adjusting the proportions of said first and second portions.

7. Apparatus according to claim 6 wherein said adjusting means are vertically displaceable.

8. Apparatus according to claim 5 including means for fluidizing said residence zone from its bottom.

9. Apparatus according to claim 5 including means forming a further residence zone located in the path of movement of said material from said preheater to said burning zone.

10. Apparatus according to claim 9 including means for fluidizing said further residence zone.

11. Apparatus according to claim 5 wherein said burner means comprises a burns assembly having at least one gasification burner including a lower temperature stage serving to produce lower temperature gas, said burner assembly also including a combustion stage subsequent to said lower temperature stage.

12. Apparatus according to claim 5 wherein said cooling zone includes at least one cyclone and a fluidized bed cooler.

13. Apparatus according to claim 5 wherein said preheater and said burning zone each comprise two paths connected in parallel and wherein said residence zone is common to both of said paths.

* * * * *